(12) United States Patent
Puchala et al.

(10) Patent No.: US 10,225,326 B1
(45) Date of Patent: Mar. 5, 2019

(54) POINT OF PRESENCE BASED DATA UPLOADING

(71) Applicant: Amazon Technologies, Inc., Seattle, WA (US)

(72) Inventors: Katarzyna Anna Puchala, Kirkland, WA (US); Anton Stephen Radlein, Seattle, WA (US); David Alexander Dunlap, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 14/666,205

(22) Filed: Mar. 23, 2015

(51) Int. Cl.
*H04L 29/08* (2006.01)
*H04L 12/803* (2013.01)

(52) U.S. Cl.
CPC .............. *H04L 67/10* (2013.01); *H04L 29/08* (2013.01); *H04L 47/125* (2013.01); *H04L 67/1097* (2013.01)

(58) Field of Classification Search
CPC .... H04L 67/10; H04L 67/1097; H04L 47/125
USPC ....................................................... 709/224
See application file for complete search history.

(56) References Cited

U.S. PATENT DOCUMENTS

| | | |
|---|---|---|
| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,649,185 A | 7/1997 | Antognini et al. |
| 5,664,106 A | 9/1997 | Caccavale |
| 5,701,467 A | 12/1997 | Freeston |
| 5,764,910 A | 6/1998 | Shachar |
| 5,774,660 A | 6/1998 | Brendel et al. |
| 5,819,033 A | 10/1998 | Caccavale |
| 5,832,517 A | 11/1998 | Knutsen, II |
| 5,852,717 A | 12/1998 | Bhide et al. |

(Continued)

FOREIGN PATENT DOCUMENTS

| | | |
|---|---|---|
| CA | 2741 895 A1 | 5/2010 |
| CN | 1422468 A | 6/2003 |

(Continued)

OTHER PUBLICATIONS

Horvath et al., "Enhancing Energy Efficiency in Multi-tier Web Server Clusters via Prioritization," in Parallel and Distributed Processing Symposium, 2007. IPDPS 2007. IEEE International, vol., No., pp. 1-6, 26-30 Mar. 2007.

(Continued)

*Primary Examiner* — Kevin T Bates
*Assistant Examiner* — Chen-Liang Huang
(74) *Attorney, Agent, or Firm* — Knobbe Martens Olson & Bear LLP

(57) ABSTRACT

A system, method and computer-readable medium for data uploading based on points of presence (POPs) are provided. In response to a client's request for data uploading, the system provides routing information for POPs that may facilitate data communications between the client and a data storage service provider. The client may fragment the upload data and transmit the data fragments via data connections to POPs, which in turn may relay the received fragments to the data storage service provider. Upon receipt of necessary data fragments, the data storage service provider may merge the data fragments to reconstruct a copy of the upload data for storage.

20 Claims, 4 Drawing Sheets

(56) References Cited

U.S. PATENT DOCUMENTS

| | | | |
|---|---|---|---|
| 5,892,914 A | 4/1999 | Pitts | |
| 5,893,116 A | 4/1999 | Simmonds et al. | |
| 5,895,462 A | 4/1999 | Toki | |
| 5,905,248 A | 5/1999 | Russell et al. | |
| 5,933,811 A | 8/1999 | Angles et al. | |
| 5,937,427 A | 8/1999 | Shinagawa et al. | |
| 5,974,454 A | 10/1999 | Apfel et al. | |
| 5,991,306 A | 11/1999 | Burns et al. | |
| 5,999,274 A * | 12/1999 | Lee | H04L 12/5692 358/400 |
| 5,999,636 A | 12/1999 | Juang | |
| 6,016,512 A | 1/2000 | Huitema | |
| 6,018,619 A | 1/2000 | Allard et al. | |
| 6,026,452 A | 2/2000 | Pitts | |
| 6,038,601 A | 3/2000 | Lambert et al. | |
| 6,052,718 A | 4/2000 | Gifford | |
| 6,078,960 A | 6/2000 | Ballard | |
| 6,085,234 A | 7/2000 | Pitts et al. | |
| 6,092,100 A | 7/2000 | Berstis et al. | |
| 6,098,096 A | 8/2000 | Tsirigotis et al. | |
| 6,108,703 A | 8/2000 | Leighton et al. | |
| 6,128,279 A | 10/2000 | O'Neil et al. | |
| 6,151,631 A | 11/2000 | Ansell et al. | |
| 6,157,942 A | 12/2000 | Chu et al. | |
| 6,167,438 A | 12/2000 | Yates et al. | |
| 6,167,446 A | 12/2000 | Lister et al. | |
| 6,173,316 B1 | 1/2001 | De Boor et al. | |
| 6,173,322 B1 | 1/2001 | Hu | |
| 6,182,111 B1 | 1/2001 | Inohara et al. | |
| 6,182,125 B1 | 1/2001 | Borella et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,223,288 B1 | 4/2001 | Byrne | |
| 6,243,761 B1 | 6/2001 | Mogul et al. | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,324,580 B1 | 11/2001 | Jindal et al. | |
| 6,330,602 B1 | 12/2001 | Law et al. | |
| 6,338,082 B1 | 1/2002 | Schneider | |
| 6,345,308 B1 | 2/2002 | Abe | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,377,257 B1 | 4/2002 | Borrel et al. | |
| 6,386,043 B1 | 5/2002 | Millins | |
| 6,389,532 B1 | 5/2002 | Gupta et al. | |
| 6,405,252 B1 | 6/2002 | Gupta et al. | |
| 6,408,360 B1 | 6/2002 | Chamberlain et al. | |
| 6,411,967 B1 | 6/2002 | Van Renesse | |
| 6,415,280 B1 | 7/2002 | Farber et al. | |
| 6,430,607 B1 | 8/2002 | Kavner | |
| 6,438,592 B1 | 8/2002 | Killian | |
| 6,442,165 B1 | 8/2002 | Sitaraman et al. | |
| 6,452,925 B1 | 9/2002 | Sistanizadeh et al. | |
| 6,457,047 B1 | 9/2002 | Chandra et al. | |
| 6,459,909 B1 | 10/2002 | Bilcliff et al. | |
| 6,473,804 B1 | 10/2002 | Kaiser et al. | |
| 6,484,143 B1 | 11/2002 | Swildens et al. | |
| 6,484,161 B1 | 11/2002 | Chipalkatti et al. | |
| 6,493,765 B1 | 12/2002 | Cunningham et al. | |
| 6,505,241 B2 | 1/2003 | Pitts | |
| 6,523,036 B1 | 2/2003 | Hickman et al. | |
| 6,529,910 B1 | 3/2003 | Fleskes | |
| 6,529,953 B1 | 3/2003 | Van Renesse | |
| 6,553,413 B1 | 4/2003 | Leighton et al. | |
| 6,553,419 B1 | 4/2003 | Ram | |
| 6,560,610 B1 | 5/2003 | Eatherton et al. | |
| 6,611,873 B1 | 8/2003 | Kanehara | |
| 6,622,168 B1 | 9/2003 | Datta | |
| 6,633,324 B2 | 10/2003 | Stephens, Jr. | |
| 6,643,357 B2 | 11/2003 | Lumsden | |
| 6,643,707 B1 | 11/2003 | Booth | |
| 6,654,807 B2 | 11/2003 | Farber et al. | |
| 6,658,462 B1 | 12/2003 | Dutta | |
| 6,665,706 B2 | 12/2003 | Kenner et al. | |
| 6,678,717 B1 | 1/2004 | Schneider | |
| 6,678,791 B1 | 1/2004 | Jacobs et al. | |
| 6,681,282 B1 | 1/2004 | Golden et al. | |
| 6,694,358 B1 | 2/2004 | Swildens et al. | |
| 6,697,805 B1 | 2/2004 | Choquier et al. | |
| 6,698,013 B1 | 2/2004 | Bertero et al. | |
| 6,714,975 B1 | 3/2004 | Aggarwal et al. | |
| 6,718,324 B2 | 4/2004 | Edlund et al. | |
| 6,724,770 B1 | 4/2004 | Van Renesse | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,760,721 B1 | 7/2004 | Chasen et al. | |
| 6,769,031 B1 | 7/2004 | Bero | |
| 6,782,398 B1 | 8/2004 | Bahl | |
| 6,785,704 B1 | 8/2004 | McCanne | |
| 6,795,434 B1 | 9/2004 | Kumar et al. | |
| 6,799,214 B1 | 9/2004 | Li | |
| 6,804,706 B2 | 10/2004 | Pitts | |
| 6,810,291 B2 | 10/2004 | Card et al. | |
| 6,810,411 B1 | 10/2004 | Coughlin et al. | |
| 6,820,133 B1 | 11/2004 | Grove et al. | |
| 6,829,654 B1 | 12/2004 | Jungck | |
| 6,862,607 B1 | 3/2005 | Vermeulen | |
| 6,868,439 B2 | 3/2005 | Basu et al. | |
| 6,874,017 B1 | 3/2005 | Inoue et al. | |
| 6,917,951 B2 | 7/2005 | Orbits et al. | |
| 6,920,498 B1 | 7/2005 | Gourlay et al. | |
| 6,925,499 B1 | 8/2005 | Chen et al. | |
| 6,928,467 B2 | 8/2005 | Peng et al. | |
| 6,928,485 B1 | 8/2005 | Krishnamurthy et al. | |
| 6,941,562 B2 | 9/2005 | Gao et al. | |
| 6,963,850 B1 | 11/2005 | Bezos et al. | |
| 6,976,090 B2 | 12/2005 | Ben-Shaul et al. | |
| 6,978,418 B1 | 12/2005 | Bain et al. | |
| 6,981,017 B1 | 12/2005 | Kasriel et al. | |
| 6,985,945 B2 | 1/2006 | Farhat et al. | |
| 6,986,018 B2 | 1/2006 | O'Rourke et al. | |
| 6,990,526 B1 | 1/2006 | Zhu | |
| 6,996,616 B1 | 2/2006 | Leighton et al. | |
| 7,003,555 B1 | 2/2006 | Jungck | |
| 7,006,099 B2 | 2/2006 | Gut et al. | |
| 7,007,089 B2 | 2/2006 | Freedman | |
| 7,009,943 B2 | 3/2006 | O'Neil | |
| 7,010,578 B1 | 3/2006 | Lewin et al. | |
| 7,010,598 B2 | 3/2006 | Sitaraman et al. | |
| 7,023,465 B2 | 4/2006 | Stephens, Jr. | |
| 7,024,466 B2 | 4/2006 | Outten et al. | |
| 7,027,582 B2 | 4/2006 | Khello et al. | |
| 7,031,445 B2 | 4/2006 | Lumsden | |
| 7,032,010 B1 | 4/2006 | Swildens et al. | |
| 7,058,633 B1 | 6/2006 | Gnagy et al. | |
| 7,058,706 B1 | 6/2006 | Iyer et al. | |
| 7,058,953 B2 | 6/2006 | Willard et al. | |
| 7,065,496 B2 | 6/2006 | Subbloie et al. | |
| 7,065,587 B2 | 6/2006 | Huitema et al. | |
| 7,072,982 B2 | 7/2006 | Teodosiu et al. | |
| 7,076,633 B2 | 7/2006 | Tormasov et al. | |
| 7,082,476 B1 | 7/2006 | Cohen et al. | |
| 7,085,825 B1 | 8/2006 | Pishevar et al. | |
| 7,086,061 B1 | 8/2006 | Joshi et al. | |
| 7,092,505 B2 | 8/2006 | Allison et al. | |
| 7,092,997 B1 | 8/2006 | Kasriel et al. | |
| 7,096,193 B1 | 8/2006 | Beaudoin et al. | |
| 7,096,266 B2 | 8/2006 | Lewin et al. | |
| 7,099,936 B2 | 8/2006 | Chase et al. | |
| 7,103,645 B2 | 9/2006 | Leighton et al. | |
| 7,107,273 B2 | 9/2006 | Ohata et al. | |
| 7,114,160 B2 | 9/2006 | Suryanarayana et al. | |
| 7,117,262 B2 | 10/2006 | Bai et al. | |
| 7,120,871 B1 | 10/2006 | Harrington | |
| 7,120,874 B2 | 10/2006 | Shah et al. | |
| 7,133,905 B2 | 11/2006 | Dilley et al. | |
| 7,136,922 B2 | 11/2006 | Sundaram et al. | |

(56) References Cited

U.S. PATENT DOCUMENTS

| | | |
|---|---|---|
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,657 B1 | 9/2007 | Alexander et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Lyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,343,399 B2 | 3/2008 | Hayball et al. |
| 7,346,676 B1 | 3/2008 | Swildens et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,373,599 B2 | 5/2008 | McElfresh et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,483,430 B1 | 1/2009 | Yuan et al. |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,581,224 B2 | 8/2009 | Romero |
| 7,593,935 B2 | 9/2009 | Sullivan |
| 7,594,189 B1 | 9/2009 | Walker et al. |
| 7,596,150 B2 | 9/2009 | Baird et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,685,270 B1 | 3/2010 | Vermeulen et al. |
| 7,685,273 B1 | 3/2010 | Anastas et al. |
| 7,693,813 B1 | 4/2010 | Cao et al. |
| 7,693,959 B2 | 4/2010 | Leighton et al. |
| 7,698,418 B2 | 4/2010 | Shimada et al. |
| 7,702,724 B1 | 4/2010 | Brydon et al. |
| 7,706,740 B2 | 4/2010 | Collins et al. |
| 7,707,071 B2 | 4/2010 | Rigole |
| 7,707,173 B2 | 4/2010 | Nanavati et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,725,658 B2 | 5/2010 | Lang et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,752,301 B1 | 7/2010 | Maiocco et al. |
| 7,756,032 B2 | 7/2010 | Feick et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 * | 8/2010 | Foley ............... H04L 29/12886 709/220 |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |

(56) References Cited

U.S. PATENT DOCUMENTS

| | | |
|---|---|---|
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 5/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 11/2011 | Baumback et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,165,915 B1 | 4/2012 | Lucash |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,209,695 B1 | 6/2012 | Pruyne et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,296,429 B2 | 10/2012 | Baumback et al. |
| 8,301,600 B1 | 10/2012 | Helmick et al. |
| 8,301,645 B1 | 10/2012 | Crook |
| 8,316,124 B1 | 11/2012 | Baumback et al. |
| 8,321,568 B2 | 11/2012 | Sivasubramanian et al. |
| 8,331,370 B2 | 12/2012 | Hamilton et al. |
| 8,380,831 B2 | 2/2013 | Barber |
| 8,380,851 B2 | 2/2013 | McCarthy et al. |
| 8,402,137 B2 | 3/2013 | Sivasuramanian et al. |
| 8,423,408 B1 | 4/2013 | Barnes et al. |
| 8,423,662 B1 | 4/2013 | Weihl et al. |
| 8,433,749 B2 | 4/2013 | Wee et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,489,737 B2 | 7/2013 | Baumback et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 7,149,747 B1 | 12/2013 | Cheng et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,930,513 B1 | 1/2014 | Richardson et al. |
| 8,930,544 B2 | 1/2014 | Richardson et al. |
| 8,645,539 B2 | 2/2014 | McCarthy et al. |
| 8,667,127 B2 | 3/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,782,236 B1 | 7/2014 | Marshall et al. |
| 8,782,279 B2 | 7/2014 | Eggleston et al. |
| 8,812,727 B1 | 8/2014 | Sorenson, III et al. |
| 8,819,283 B2 | 8/2014 | Richardson et al. |
| 8,826,032 B1 | 9/2014 | Yahalom et al. |
| 8,843,625 B2 | 9/2014 | Baumback et al. |
| 8,902,897 B2 | 12/2014 | Hamilton et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,971,328 B2 | 3/2015 | Judge et al. |
| 8,972,580 B2 | 3/2015 | Fleischman et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |

(56) References Cited

U.S. PATENT DOCUMENTS

| | | |
|---|---|---|
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,071,502 B2 | 6/2015 | Baumback et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,106,701 B2 | 8/2015 | Richardson et al. |
| 9,116,803 B1 | 8/2015 | Agrawal et al. |
| 9,118,543 B2 | 8/2015 | Baumback et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,099 B2 | 12/2015 | Baumback et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,282,032 B2 | 3/2016 | Judge et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,367,929 B2 | 6/2016 | Bettis et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,491,073 B2 | 11/2016 | Baumback et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,660,890 B2 | 5/2017 | Baumback et al. |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,769,248 B1 | 9/2017 | Krishnan et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 * | 2/2018 | Bergman ............... H04L 45/70 |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0034771 A1 | 10/2001 | Hutsch et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0016802 A1 | 2/2002 | Hodgkinson |
| 2002/0035624 A1 | 3/2002 | Jun-Hyeong |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0073235 A1 | 6/2002 | Chen et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099829 A1 | 7/2002 | Richards et al. |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107913 A1 | 8/2002 | Rivera et al. |
| 2002/0107944 A1 | 8/2002 | Bai et al. |

(56) References Cited

U.S. PATENT DOCUMENTS

| | | |
|---|---|---|
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0143675 A1 | 10/2002 | Orshan |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0161911 A1 | 10/2002 | Pinckney, III et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2002/0198963 A1 | 12/2002 | Wu et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0128233 A1 | 7/2003 | Kasriel |
| 2003/0130982 A1 | 7/2003 | Kasriel |
| 2003/0131106 A1 | 7/2003 | Kasriel |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0179742 A1 | 9/2003 | Ogier et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0221000 A1 | 11/2003 | Cherkasova et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2003/0236836 A1 | 12/2003 | Borthwick |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039794 A1 | 2/2004 | Biby et al. |
| 2004/0039798 A1 | 2/2004 | Hotz et al. |
| 2004/0039820 A1 | 2/2004 | Colby et al. |
| 2004/0044731 A1 | 3/2004 | Chen et al. |
| 2004/0044791 A1 | 3/2004 | Pouzzner |
| 2004/0049541 A1 | 3/2004 | Swahn |
| 2004/0049579 A1 | 3/2004 | Ims et al. |
| 2004/0054757 A1 | 3/2004 | Ueda et al. |
| 2004/0059796 A1 | 3/2004 | McLintock |
| 2004/0059805 A1 | 3/2004 | Dinker et al. |
| 2004/0064293 A1 | 4/2004 | Hamilton et al. |
| 2004/0064335 A1 | 4/2004 | Yang |
| 2004/0064501 A1 | 4/2004 | Jan et al. |
| 2004/0064558 A1 | 4/2004 | Miyake |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 6/2004 | Haneda et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0128538 A1 | 7/2004 | Gmuender et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0199603 A1 | 10/2004 | Tafla et al. |

(56) References Cited

U.S. PATENT DOCUMENTS

| | | |
|---|---|---|
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0010668 A1 | 1/2005 | Chen |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0055420 A1 | 3/2005 | Wyler |
| 2005/0076339 A1 | 4/2005 | Merril et al. |
| 2005/0086645 A1 | 4/2005 | Diao et al. |
| 2005/0091612 A1 | 4/2005 | Stabb et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0181769 A1 | 8/2005 | Kogawa |
| 2005/0182826 A1 | 8/2005 | Knittel et al. |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223091 A1 | 10/2005 | Zahavi et al. |
| 2005/0223092 A1 | 10/2005 | Sapiro et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0273507 A1 | 12/2005 | Yan et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0005014 A1 | 1/2006 | Aura et al. |
| 2006/0013158 A1 | 1/2006 | Ahuja et al. |
| 2006/0015865 A1 | 1/2006 | Schneider et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0026275 A1 | 2/2006 | Gilmour et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0069808 A1 | 3/2006 | Mitchell et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0209701 A1 | 9/2006 | Zhang et al. |
| 2006/0218256 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0235961 A1 | 10/2006 | Klein et al. |
| 2006/0251339 A1 | 11/2006 | Gokturk et al. |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |

(56) References Cited

U.S. PATENT DOCUMENTS

| | | |
|---|---|---|
| 2006/0282758 A1 | 12/2006 | Simons et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0016736 A1 | 1/2007 | Takeda et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0088805 A1 | 4/2007 | Cyster |
| 2007/0094325 A1 | 4/2007 | Ih et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118640 A1 | 5/2007 | Subramanian et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0136469 A1 | 6/2007 | Nusbickel |
| 2007/0143672 A1 | 6/2007 | Lipton et al. |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0214454 A1 | 9/2007 | Edwards et al. |
| 2007/0219795 A1 | 9/2007 | Park et al. |
| 2007/0220010 A1 | 9/2007 | Ertugrul |
| 2007/0226058 A1 | 9/2007 | Lorenzen et al. |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0239610 A1 | 10/2007 | Lemelson |
| 2007/0243860 A1 | 10/2007 | Aiello et al. |
| 2007/0244964 A1 | 10/2007 | Challenger et al. |
| 2007/0245010 A1 | 10/2007 | Arn et al. |
| 2007/0245022 A1 | 10/2007 | Olliphant et al. |
| 2007/0245299 A1 | 10/2007 | Sung et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266151 A1 | 11/2007 | Friedland et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2007/0299869 A1 | 12/2007 | Clary et al. |
| 2007/0299965 A1 | 12/2007 | Nieh et al. |
| 2007/0300152 A1 | 12/2007 | Baugher |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037432 A1 | 2/2008 | Cohen et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1* | 2/2008 | Bugenhagen ....... H04L 43/0817 370/230.1 |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0098310 A1 | 4/2008 | Choi |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0104502 A1 | 5/2008 | Olston |
| 2008/0109679 A1 | 5/2008 | Wright et al. |
| 2008/0114829 A1 | 5/2008 | Button et al. |
| 2008/0114875 A1 | 5/2008 | Anastas et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0183672 A1 | 7/2008 | Canon et al. |
| 2008/0183721 A1 | 7/2008 | Bhogal et al. |
| 2008/0189437 A1 | 8/2008 | Halley |
| 2008/0201332 A1 | 8/2008 | Souders et al. |
| 2008/0215583 A1 | 9/2008 | Gunawardena et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0250327 A1 | 10/2008 | Li et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |

(56) References Cited

U.S. PATENT DOCUMENTS

| | | |
|---|---|---|
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0037517 A1 | 2/2009 | Frei |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089448 A1 | 4/2009 | Sze et al. |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0122714 A1 | 5/2009 | Kato |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0319636 A1 | 12/2009 | Tokumi |
| 2009/0327460 A1 | 12/2009 | Yoo et al. |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0005403 A1 | 1/2010 | Rozmaryn et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0070700 A1 | 3/2010 | Borst et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0128638 A1 | 5/2010 | Navas et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0211459 A1 | 8/2010 | Seeman et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0325615 A1 | 12/2010 | Ramot |
| 2010/0332595 A1 | 12/2010 | Fullagar et al. |
| 2010/0332650 A1 | 12/2010 | Aisen et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |

(56) References Cited

U.S. PATENT DOCUMENTS

| | | |
|---|---|---|
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0145715 A1 | 6/2011 | Malloy et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0023226 A1 | 1/2012 | Petersen et al. |
| 2012/0036238 A1 | 2/2012 | Sundaram et al. |
| 2012/0041970 A1 | 2/2012 | Ghosh et al. |
| 2012/0042277 A1 | 2/2012 | Lin-Hendel |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0164621 A1 | 6/2012 | Katz et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0278229 A1 | 11/2012 | Vishwanathan et al. |
| 2012/0278831 A1* | 11/2012 | van Coppenolle .......... H04L 65/4084 725/25 |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0019311 A1 | 1/2013 | Swildens et al. |
| 2013/0031040 A1 | 1/2013 | Modha |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191450 A1 | 7/2013 | Bodenhamer et al. |
| 2013/0191499 A1 | 7/2013 | Ludin et al. |
| 2013/0198298 A1 | 8/2013 | Li et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1* | 10/2013 | Ahmadi ............ H04W 28/0205 370/235 |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059120 A1 | 2/2014 | Richardson et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108672 A1 | 4/2014 | Ou et al. |
| 2014/0113600 A1 | 4/2014 | El Gamal et al. |
| 2014/0122698 A1 | 5/2014 | Batrouni et al. |
| 2014/0122725 A1 | 5/2014 | Batrouni et al. |

(56) References Cited

U.S. PATENT DOCUMENTS

| | | |
|---|---|---|
| 2014/0129707 A1 | 5/2014 | Baumback et al. |
| 2014/0137111 A1 | 5/2014 | Dees et al. |
| 2014/0143320 A1 | 5/2014 | Sivasubramanian et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0219279 A1 | 8/2014 | Gross et al. |
| 2014/0244937 A1 | 8/2014 | Bloomstein et al. |
| 2014/0257891 A1 | 9/2014 | Richardson et al. |
| 2014/0269371 A1 | 9/2014 | Badea et al. |
| 2014/0280606 A1 | 9/2014 | Long |
| 2014/0280679 A1 | 9/2014 | Dey et al. |
| 2014/0297870 A1 | 10/2014 | Eggleston et al. |
| 2014/0304406 A1 | 10/2014 | Baumback et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351871 A1 | 11/2014 | Bomfim et al. |
| 2014/0365666 A1 | 12/2014 | Richardson et al. |
| 2015/0006615 A1 | 1/2015 | Wainner et al. |
| 2015/0012649 A1 | 1/2015 | Baumback et al. |
| 2015/0019686 A1 | 1/2015 | Backholm |
| 2015/0026407 A1 | 1/2015 | Mclellan et al. |
| 2015/0032801 A1 | 1/2015 | Hart |
| 2015/0067171 A1 | 3/2015 | Yum |
| 2015/0074228 A1 | 3/2015 | Drake |
| 2015/0081842 A1 | 3/2015 | Richardson et al. |
| 2015/0088968 A1 | 3/2015 | Wei et al. |
| 2015/0088972 A1 | 3/2015 | Brand et al. |
| 2015/0089621 A1 | 3/2015 | Khalid |
| 2015/0106864 A1 | 4/2015 | Li et al. |
| 2015/0154051 A1 | 6/2015 | Kruglick |
| 2015/0156279 A1 | 6/2015 | Vaswani et al. |
| 2015/0156280 A1 | 6/2015 | Vaswani et al. |
| 2015/0172178 A1 | 6/2015 | Judge et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188734 A1* | 7/2015 | Petrov ............... H03M 13/116 375/260 |
| 2015/0188994 A1 | 7/2015 | Marshall et al. |
| 2015/0189042 A1* | 7/2015 | Sun ..................... H04L 67/10 709/217 |
| 2015/0195244 A1 | 7/2015 | Richardson et al. |
| 2015/0200991 A1 | 7/2015 | Kwon |
| 2015/0207733 A1 | 7/2015 | Richardson et al. |
| 2015/0215270 A1 | 7/2015 | Sivasubramanian et al. |
| 2015/0215656 A1 | 7/2015 | Pulung et al. |
| 2015/0220990 A1 | 8/2015 | Kobyakov et al. |
| 2015/0229710 A1 | 8/2015 | Sivasubramanian et al. |
| 2015/0242379 A1 | 8/2015 | Kuivinen et al. |
| 2015/0244580 A1 | 8/2015 | Saavedra |
| 2015/0249579 A1 | 9/2015 | Ellsworth et al. |
| 2015/0256647 A1 | 9/2015 | Richardson et al. |
| 2015/0288593 A1 | 10/2015 | Campbell |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0326491 A1 | 11/2015 | Baumback et al. |
| 2015/0333997 A1 | 11/2015 | Mermoud et al. |
| 2015/0334082 A1 | 11/2015 | Richardson et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028644 A1 | 1/2016 | Richardson et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0132600 A1 | 5/2016 | Woodhead et al. |
| 2016/0134492 A1 | 5/2016 | Ellsworth et al. |
| 2016/0142251 A1 | 5/2016 | Contreras et al. |
| 2016/0142367 A1 | 5/2016 | Richardson et al. |
| 2016/0182454 A1 | 6/2016 | Phonsa et al. |
| 2016/0182542 A1 | 6/2016 | Staniford |
| 2016/0188181 A1 | 6/2016 | Smith |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0241651 A1 | 8/2016 | Sivasubramanian et al. |
| 2016/0253262 A1 | 9/2016 | Nadgowda |
| 2016/0254985 A1 | 9/2016 | Judge et al. |
| 2016/0267354 A1 | 9/2016 | Bettis et al. |
| 2016/0274929 A1 | 9/2016 | King |
| 2016/0294678 A1 | 10/2016 | Khakpour et al. |
| 2016/0308959 A1 | 10/2016 | Richardson et al. |
| 2016/0366202 A1 | 12/2016 | Phillips et al. |
| 2017/0041428 A1 | 2/2017 | Katsev |
| 2017/0070446 A1 | 3/2017 | Baumback et al. |
| 2017/0085495 A1 | 3/2017 | Richardson et al. |
| 2017/0109316 A1 | 4/2017 | Hack et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0187591 A1 | 6/2017 | Baumback et al. |
| 2017/0214755 A1 | 7/2017 | Sivasubramanian et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |
| 2018/0007121 A1 | 1/2018 | Krishnan et al. |
| 2018/0063027 A1 | 3/2018 | Rafferty |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |
| 2018/0213052 A1 | 7/2018 | Maccarthaigh et al. |
| 2018/0278717 A1 | 9/2018 | Richardson et al. |
| 2018/0287916 A1 | 10/2018 | Mizik et al. |
| 2018/0302322 A1 | 10/2018 | Richardson et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 101473598 A | 7/2009 |
| CN | 103731481 A | 4/2014 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-023450 A | 1/2004 |

(56) References Cited

FOREIGN PATENT DOCUMENTS

| | | |
|---|---|---|
| JP | 2004-070935 | 3/2004 |
| JP | 2004-532471 | 10/2004 |
| JP | 2004-533738 A | 11/2004 |
| JP | 2005-537687 | 12/2005 |
| JP | 3748216 B2 | 2/2006 |
| JP | 2007-133896 A | 5/2007 |
| JP | 2007-207225 A | 8/2007 |
| JP | 2008-515106 | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

Fifth Office Action in Chinese Application No. 200980111426.1 dated Aug. 14, 2015.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Office Action in European Application No. 11767118.0 dated Feb. 3, 2017.
Armour et al.: "A Heuristic Algorithm and Simulation Approach to Relative Location of Facilities"; Management Science, vol. 9, No. 2 (Jan. 1963); pp. 294-309.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Office Action in Chinese Application No. 201310717573.1 dated Jul. 29, 2016.
Kenshi, P., "Help File Library: Iptables Basics," Justlinux, retrieved Dec. 1, 2005, from http://www.justlinux.com/nhf/Security/Iptables_Basics.html, 4 pages.
Office Action in Japanese Application No. 2014-225580 dated Oct. 26, 2015.
Second Office Action in Chinese Application No. 201180046104.0 dated Sep. 29, 2015.
Office Action in Canadian Application No. 2816612 dated Nov. 3, 2015.
Office Action in European Application No. 09839809.2 dated Dec. 8, 2016.
Office Action in Japanese Application No. 2014-225580 dated Oct. 3, 2016.
Partial Supplementary Search Report in European Application No. 09826977.2 dated Oct. 4, 2016.
Decision of Rejection in Chinese Application No. 201180046104.0 dated Oct. 17, 2016.
Office Action in Canadian Application No. 2816612 dated Oct. 7, 2016.
Office Action in Japanese Application No. 2011-516466 dated May 30, 2016.
Office Action in Russian Application No. 2015114568 dated May 16, 2016.
Office Action in Chinese Application No. 201310537815.9 dated Jul. 5, 2016.
Office Action in Japanese Application No. 2011-502139 dated Aug. 17, 2015.
Third Office Action in Chinese Application No. 201180046104.0 dated Apr. 14, 2016.
Office Action in Japanese Application No. 2015-533132 dated Apr. 25, 2016.
Office Action in Canadian Application No. 2884796 dated Apr. 28, 2016.
Office Action in Japanese Application No. 2015-075644 dated Apr. 5, 2016 in 8 pages.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Search Report for European Application No. 09839809.2 dated May 11, 2015.
First Office Action in Chinese Application No. 201180053405.6 dated May 3, 2015.
Sharif et al, "Secure In-VM Monitoring Using Hardware Virtualization", Microsoft, Oct. 2009 http://research.microsoft.com/pubs/153179/sim-ccs09.pdf; 11 pages.
Second Office Action in Chinese Application No. 201180053405.6 dated Dec. 4, 2015.
Office Action in European Application No. 07754164.7 dated Dec. 14, 2015.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

(56) References Cited

OTHER PUBLICATIONS

"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/—smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, in Proc. of Networking 2005, all pages.
Gunther et al, "Measuring Round Trip Times to determine the Distance between WLAN Nodes", Dec. 18, 2004, Technical University Berlin, all pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123 (No English Translation).
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21(2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, I5 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.

(56) References Cited

OTHER PUBLICATIONS

First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
Preliminary Examination in Chinese Application No. 201310717573.1 dated Feb. 25, 2014.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 dated Nov. 19, 2012.
Examination Report in Singapore Application No. 201103333-9 dated Aug. 13, 2013.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Preliminary Examination in Chinese Application No. 201180053405.6 dated May 28, 2013.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 2 pages.
Office Action in Canadian Application No. 2816612 dated Aug. 8, 2017.
Supplementary Examination Report in Singapore Application No. 11201501987U dated May 17, 2017.
Office Action in Chinese Application No. 201310537815.9 dated Jun. 2, 2017.
International Search Report and Written Opinion in PCT/US/2016/066848 dated May 1, 2017.
Al-Fares, M. et al., A Scalable, Commodity Data Center Network Architecture, SIGCOMM '08 Proceedings, Aug. 17, 2008, pp. 63-74, 66-68, 70-71, Seattle, WA.
Arcelli et al., "A New Technique for Image Magnification", p. 53-61, 2009.
Bennami, M., et al., Resource Allocation for Autonomic Data Centers Using Analytic Performance Models, 2005, IEEE, 12 pages.
Chang, F., et al., Automatic Configuration and Run-time Adaptation of Distributed Applications, 2000, IEEE, 10 pages.
Feldmeier, Improving Gateway Performance With a Routing-Table Cache, Massachusetts Institute of Technology, Laboratory for Computer Science, IEEE, Mar. 27, 1988, pp. 298-307.
Greenberg, A. et al., Networking the Cloud, 29th IEEE International Conference on Distributed Computing Systems (ICDCS 2009), Jun. 22, 2009-Jun. 26, 2009 [online] retrieved from the Internet on Mar. 10, 2011: http://www.cse.ohio-state.edu/icdcs2009/Keynote_files/greenberg-keynote.pdf, pp. 1-45.
Greenberg, A. et al., Towards a Next Generation Data Center Architecture: Scalability and Commoditization, SIGCOMM '08: Proceedings of the 2008 SIGCOMM Conference and Co-Located Workshops NSDR '08, WOSN '08, MOBIARCH '08, NETECON '08, & Presto '08, Seattle, WA, Aug. 17-28, 2008, ACM, Aug. 17, 2008, pp. 57-62, New York, NY.

(56) References Cited

OTHER PUBLICATIONS

Greenberg, A. et al., VL2: A scalable and flexible data center network, SIGCOMM '09, Proceedings of the ACM SIGCOMM 2009 Conference on Data Communication, Aug. 17, 2009, vol. 39, Issue 4, pp. 51-62.
Halpern, et al., Internet Draft, "Advertising Equal Cost Multipath routes in BGP; draft-bhatia-ecmp-routes-in-bgp-02.txt", The Internet Society 2006, 16 pages.
Kalogiros et al, "Understanding Incentives for Prefix Aggregation in BGP", Re-Architecting the Internet, ACM, Dec. 1, 2009, pp. 49-54.
Kounev, S., et al., Autonomic QoS-Aware Resource Management in Grid Computing Using Online Performance Models, 2007, ICST, Valuetools, 2007, 10 pages.
Ludwig, "Traffic engineering with BGP", Seminar "Internet Routing", Technical University Berlin, Jul. 2, 2009, pp. 1-10.
McCulloch et al. "A Logical Calculus of the Ideas Immanent in Nervous Activity", Bulletin of Mathematical Biophysics, vol. 5, 1943, 19 pages.
Mysore, R.N. et al., Portland: a scalable fault-tolerant layer 2 data center network fabric, SIGCOMM '09, Proceedings of the ACM SIGCOMM 2009 Conference on Data Communication, Aug. 17, 2009, pp. 39-50.
Nilsson et al., IP-Address Lookup Using LC-Tries, IEEE Journal on Selected Areas of Communication, Jun. 1999, vol. 17, Issue 6, pp. 1083-1092.
Schlansker et al,"Killer Fabrics for Scalable Datacenters", HP Technical Report, HPL-2009-26, 26 Feb. 26, 2009, 16 pages.
International Search Report and Written Opinion in PCT/US2010/060567 dated Mar. 28, 2012.
International Preliminary Report on Patentability and Written Opinion in PCT/US2010/060567 dated Jun. 19, 2012.
Office Action in Canadian Application No. 2784699 dated Apr. 28, 2014.
Office Action in Chinese Application No. 201080057225.0 dated Jul. 2, 2014.
Office Action in Chinese Application No. 201080057225.0 dated May 14, 2015.
Office Action in Japanese Application No. 2012-544790dated Feb. 2, 2015.
Office Action in Japanese Application No. 2012-544790dated Oct. 26, 2015.
Office Action in Japanese Application No. 2016-128622 dated Jun. 19, 2017.
Extended Search Report in European Application No. 16001481.7 dated Dec. 5, 2016.
International Preliminary Report on Patentability and Written Opinion in PCT/US2010/060573 dated Jun. 19, 2012.
Office Action in Chinese Application No. 201080057155.9 dated Jul. 24, 2014.
Office Action in Chinese Application No. 201080057155.9 dated May 21, 2015.
Office Action in European Application No. 10801307.9 dated Jun. 6, 2014.
Office Action in Canadian Application No. 2784707 dated Feb. 25, 2014.
Office Action in European Application No. 16001481.7 dated Sep. 12, 2017.
International Preliminary Report on Patentability and Written Opinion in PCT/US2010/060569 dated Jun. 19, 2012.
Office Action in Canadian Application No. 2784706 dated May 22, 2014.
First Office Action in Chinese Application No. 201080057229.9 dated May 14, 2014.
Second Office Action in Chinese Application No. 201080057229.9 dated Mar. 18, 2015.
Extended Search Report in European Application No. 16001480.9 dated Dec. 5, 2016.
Office Action in European Application No. 16001480.9 dated Sep. 12, 2017.
Office Action in Japanese Application No. 2016-128675 dated Jun. 19, 2017.
Office Action in Chinese Application No. 2013800492635 dated Aug. 30, 2017.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Office Action in Indian Application No. 5937/CHENP/2010 dated Jan. 19, 2018.
Office Action in Indian Application No. 6210/CHENP/2010 dated Mar. 27, 2018.
Office Action in Chinese Application No. 201310537815.9 dated Feb. 1, 2018.
Office Action in European Application No. 07754164.7 dated Jan. 25, 2018.
International Search Report and Written Opinion in PCT/US2017/055156 dated Dec. 13, 2017.
Office Action in Application No. 09729072.0 dated May 14, 2018.
Examination Report in Indian Application No. 6213/CHENP/2010 dated May 23, 2018.
International Preliminary Report on Patentability in PCT/US/2016/066848 dated Jun. 19, 2018.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
JH Software, Moving a DNS Server to a New IP Address, last updated Jan. 26, 2006, 1 page.
Office Action in European Application No. 11767118.0 dated Jul. 25, 2018.
Extended Search Report in European Application No. 18156163 dated Sep. 3, 2018.

* cited by examiner

POINT OF PRESENCE BASED DATA UPLOADING

BACKGROUND

Generally described, computing devices and communication networks can be utilized to exchange information. In a common application, a computing device can upload data to another computing device via a communication network. For example, a user at a personal computing device can utilize a data transfer protocol to send digital media files, computer executable code, system backup images, etc., to a server computing device via the Internet. In such embodiments, the user computing device can be referred to as a client computing device and the server computing device can be referred to as a data storage service provider. In another common application, a client computing device can request data from another computing device via a communication network. For example, a user at a client computing device can utilize a software browser application to request a Web page or application from a server computing device via the Internet. In such embodiments, the server computing device can be referred to as a content provider.

Some data storage service providers are associated with content providers, which may facilitate the delivery of requested content, such as Web pages or resources, through the utilization of a point of presence ("POP") service provider. A POP service provider typically maintains a number of computing devices, generally referred to as "points of presence" or "POPs" in a communication network. The POPs can include data storage components that maintain content from various content providers. In turn, content providers can instruct, or otherwise suggest to, client computing devices to request some, or all, of a content provider's content from the POPs, allowing content providers to deliver content closer to clients.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
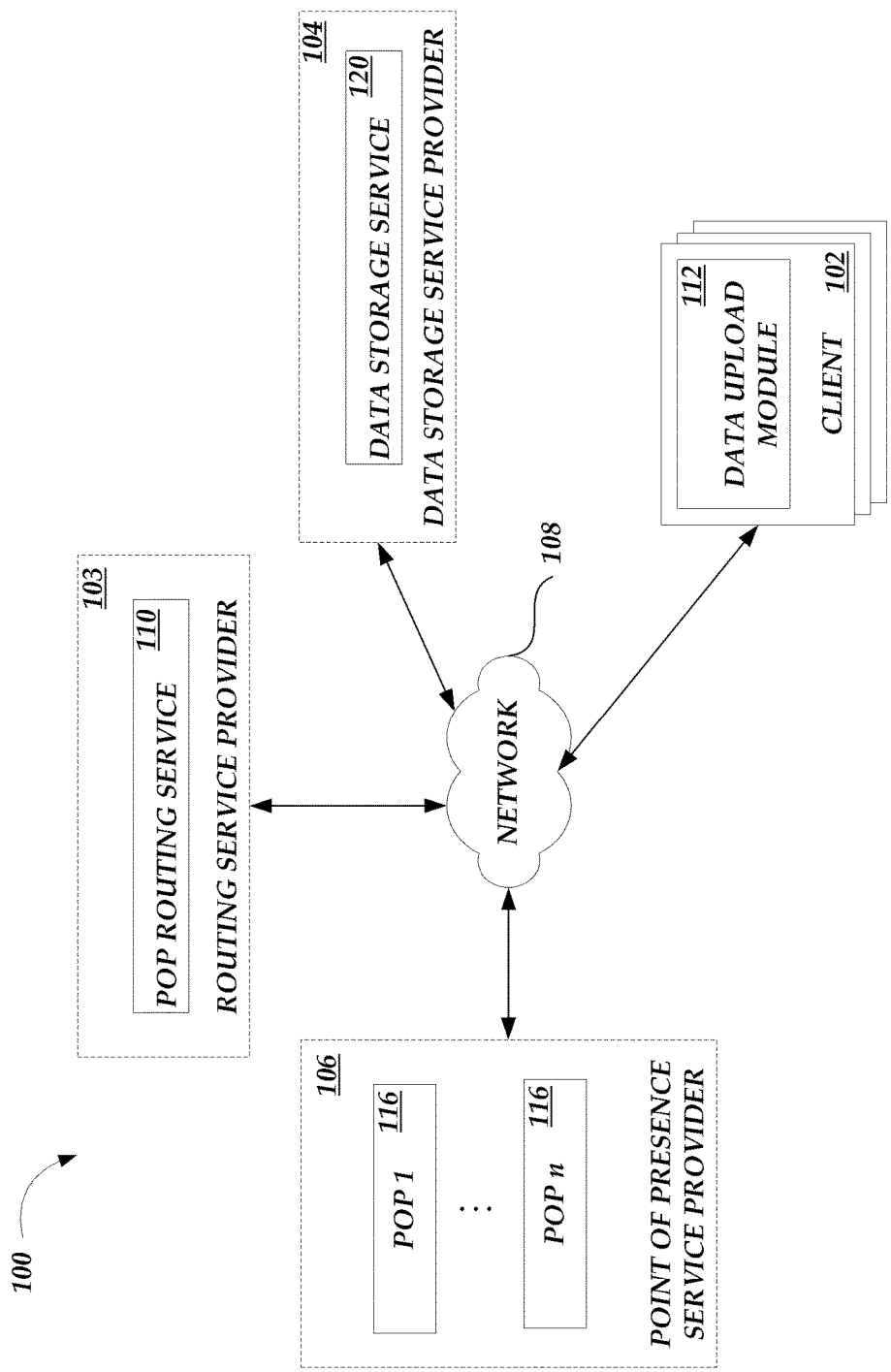
FIG. 1 is a block diagram illustrative of a data communication environment including a number of client computing devices, a routing service provider, a data storage service provider, and a point of presence service provider.

Generally described, the present disclosure is directed to data communication between a client computing device and a data storage service provider via one or more intermediate devices or systems. Specifically, aspects of the disclosure will be described with regard to uploading data from a client computing device to a data storage service provider utilizing multiple points of presence (POPs). Additionally, aspects of the disclosure will be described with regard to fragmentation of upload data by the client computing device, transmission of the data fragments via POPs, and merging the data fragments by the data storage service provider.

In accordance with an illustrative embodiment, a data storage service provider is communicatively connected with one or more POPs. For example, the data storage service provider may correspond to or otherwise be associated with a content provider, which utilizes a POP service provider for delivering content to client computing devices. Illustratively, a POP service provider may correspond to a content delivery network (CDN) service provider, which maintains multiple POP locations across a communication network and assists the content provider in efficient content delivery to clients. Alternatively, the data storage service provider may include or be directly associated with multiple POPs to facilitate communications with client computing devices.

When the data storage service provider receives a request from a client computing device to upload data, the data storage service determines which POPs may facilitate the uploading. This can be facilitated by a routing service provider associated with the data storage service provider. Illustratively, the associated routing service provider can make this determination based on POP performance information, such as latency, geographic proximity, bandwidth, throughput, capacity, cost, load or availability. In some embodiments, the routing service provider maintains and updates the POP performance information, based on characteristics of past or ongoing communications with the POPs. In other embodiments, the routing service provider obtains relevant POP performance information from an associated POP service provider. The routing service provider then provides routing information regarding the determined POPs to the client computing device. For example, the routing service provider may provide Internet Protocol (IP) addresses corresponding to the POPs to the client computing device. Alternatively or in addition, the routing service provider may request the associated POP service provider to determine POPs that may facilitate the requested data upload and to provide routing information regarding the determined POPs.

Upon receipt of the routing information, the client computing device may further evaluate the POPs included in the routing information and decide which POPs to use for data uploading. For example, the client computing device may test the speed, robustness, stability, protocol compatibility or other characteristics of communication with individual POPs. The client computing device may fragment the data to be uploaded and establish network connections with at least a subset of the POPs based on the routing information and/or the POP evaluation results. The client computing device then attempts to distribute and transmit the data fragments to each of the subset of POPs, and may adjust respective quantities of data fragments that are being assigned to different POPs based on the performance of data transmissions thereto. In some embodiments, the client computing device may decide to cease data transmission to certain POPs due to inadequate performance. In some embodiments, the client computing device may redirect transmission of certain data fragments to POPs that were not initially selected to facilitate the data upload.

The POPs that have received at least some of the data fragments may forward or relay the data fragments using their existing communication channels, such as network paths via a backbone or overlay network, to the data storage service provider. Upon receipt of the data fragments relayed from one or more POPs, the data storage service provider may merge or otherwise process the fragments to reconstruct a single copy of the upload data and confirm completion of data upload with the client computing device. In some embodiments, redundancies are built into the data fragmentation (e.g., based on a forward error correction code) so that the data storage service provider does not need to receive all the data fragments and may reconstruct the upload data based on a sufficiently large proportion of the data fragments.

Although various aspects of the disclosure will be described with regard to illustrative examples and embodiments, one skilled in the art will appreciate that the disclosed embodiments and examples should not be construed as limiting. For example, although aspects of the disclosure will be described with regard to specific service providers such as a data storage service provider, a routing service provider or a POP service provider, one skilled in the relevant art will appreciate that aspects of the disclosure may be implemented by a single service provider or various types of service providers, or that a service provider implementing aspects of the disclosure is not required to have the specific components utilized in the illustrative examples.

FIG. 1 is a block diagram illustrative of a data communication environment 100 for the management and processing of data uploads. As illustrated in FIG. 1, the data communication environment 100 includes a number of client computing devices 102 ("clients") uploading data or otherwise communicating with a routing service provider, a data storage service provider, a POP service provider, or other service providers. In an illustrative embodiment, the clients 102 can correspond to a wide variety of computing devices including desktop computers, laptop computers, tablets, personal digital assistants (PDAs), mobile phones, electronic book readers, other wireless handheld devices, set-top or other television boxes, media players, video game platforms, kiosks, and/or the like.

In an illustrative embodiment, the clients 102 include necessary hardware and software components for establishing communications over a communication network 108. For example, the client computing devices 102 may be equipped with networking equipment and browser software applications that facilitate communications via the network 108. In particular, the clients 102 may include or otherwise be associated with a data upload module 112, implemented in hardware or software. The data upload module 112 may transmit data upload requests, receive POP routing information, generate fragments of upload data, establish connections with POPs, transmit upload data fragments, and/or implement other related functionalities as disclosed herein.

The network 108 can be a publicly accessible network of linked networks, possibly operated by various distinct parties, such as the Internet. In other embodiments, the network 108 may include a private network, personal area network ("PAN"), LAN, WAN, cable network, satellite network, any other medium of computer data transfer, or some combination thereof.

The data communication environment 100 can also include a routing service provider 103 in communication with the one or more clients 102 via the communication network 108. The routing service provider 103 illustrated in FIG. 1 corresponds to a logical association of one or more computing devices associated with a routing service provider, a data storage service provider and/or a content provider. Specifically, the routing service provider 103 can include a POP routing service 110 corresponding to one or more computing devices for obtaining and processing POP routing requests for uploading data from the clients 102 to a data storage service provider 104 and for providing POP routing information in response. The POP routing service 110 may be associated with a data store maintaining performance data, such as latency, geographic proximity, bandwidth, throughput, capacity, cost, load or availability, for individual POPs. The performance data may be generated based on past or ongoing data communications between the data storage service provider 104 and individual POPs. Alternatively or in addition, the performance data can be constantly updated by POPs or their associated service provider.

The data communication environment 100 can further include a data storage service provider 104 in communication with the one or more clients 102 and the routing service provider 103 via the communication network 108. The data storage service provider 104 illustrated in FIG. 1 corresponds to a logical association of one or more computing devices associated with a data storage service provider and/or a content provider. Specifically, the data storage service provider 104 can include a data storage service 120 and associated storage component corresponding to one or more computing devices for obtaining and merging upload data fragments and for storing reconstructed copies of upload data.

One skilled in the relevant art will appreciate that the routing service provider 103 or data storage service provider 104 can be associated with various additional computing resources, such additional computing devices for administration of data and resources, DNS nameservers, and the like. For example, although not illustrated in FIG. 1, the routing service provider 103 or data storage service provider 104 can be associated with one or more DNS nameserver components that receive DNS queries associated with the domain of the data storage service provider 104 and that would be authoritative to resolve client computing device DNS queries corresponding to a domain of the data storage service provider (e.g., return one or more IP addresses responsive to the DNS query).

With continued reference to FIG. 1, the data communication environment 100 can further include a POP service provider 106 in communication with the one or more clients 102, the routing service provider 103 and the data storage service providers 104 via the communication network 108. The POP service provider 106 illustrated in FIG. 1 corresponds to a logical association of one or more computing devices associated with a POP service provider. Specifically, the POP service provider 106 can include a number of point of presence ("POP") locations 116 that correspond to nodes on the communication network 108. Each POP 116 may include a data storage component made up of a number of computing devices for caching or storing data for the data storage service provider 104, an associated content provider, or other service providers. In some embodiments, the POP service provider may include or be associated with a data store for maintaining information regarding individual POP performance with respect to different service providers and/or clients.

Although the POPs 116 are illustrated in FIG. 1 as logically associated with the POP provider 106, the POPs 116 can be geographically distributed throughout the communication network 108 in a manner to best serve various demographics of clients 102. Additionally, one skilled in the relevant art will appreciate that the POP service provider 106 can be associated with various additional computing resources, such as DNS nameservers, computing devices or components for rearranging, regrouping, or otherwise manipulating data fragments, and the like.

Figure 2:
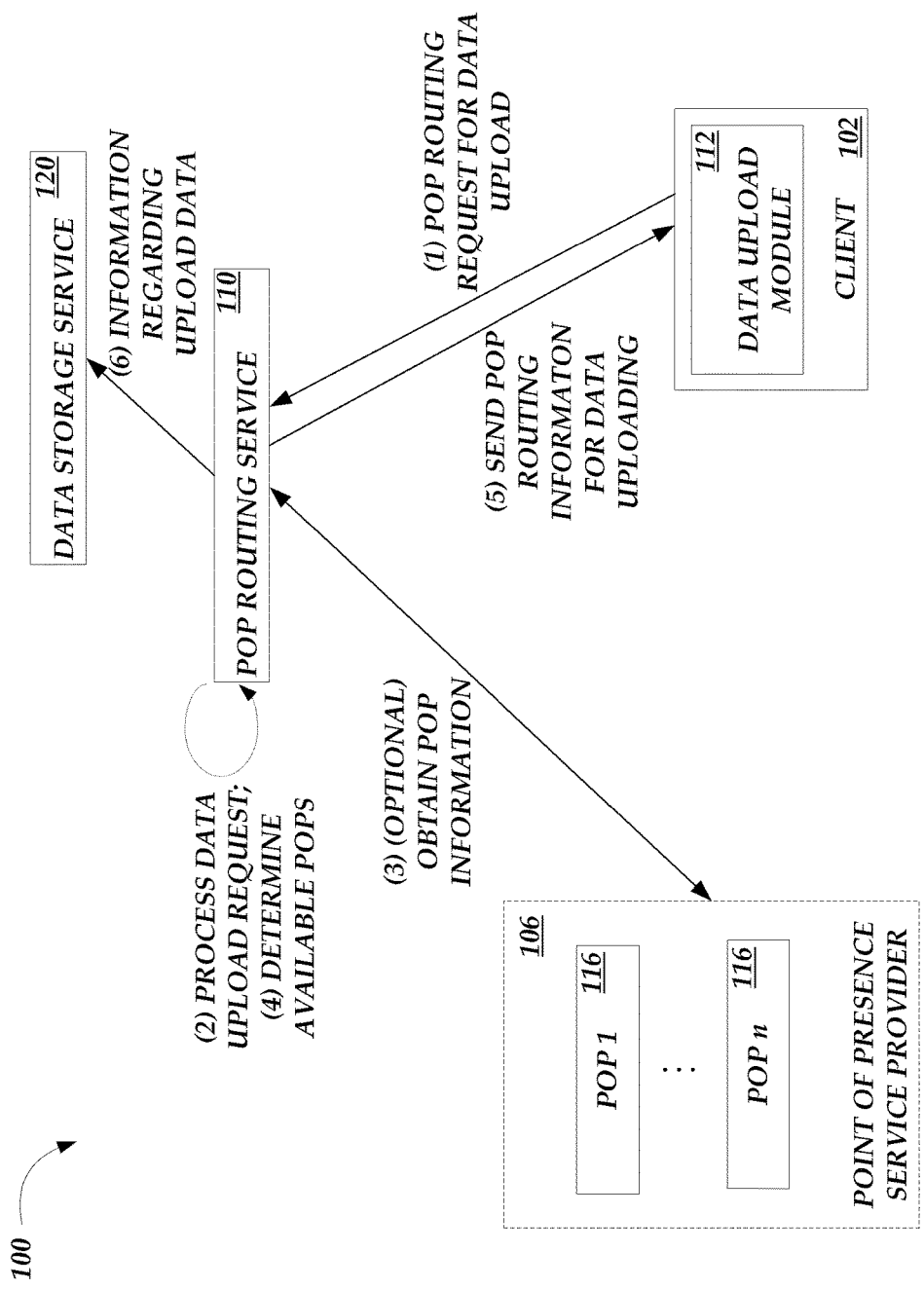
FIG. 2 is a block diagram of the data communication environment of FIG. 1 illustrating POP routing information being provided in response to a request from a client computing device.
Figure 3:
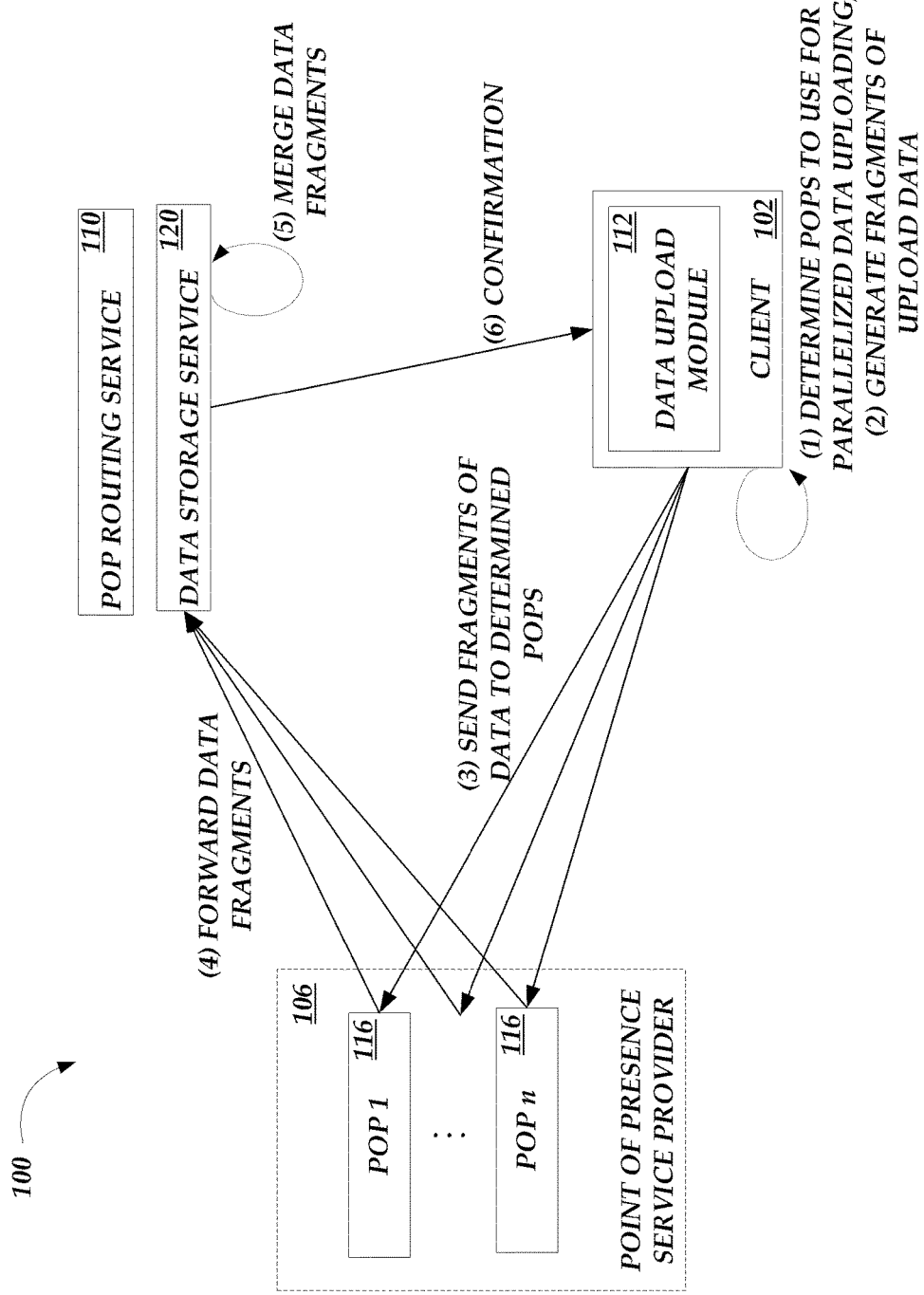
FIG. 3 is a block diagram of the data communication environment of FIG. 1 illustrating the generation, transmitting and merging of fragments of upload data.

With reference now to FIG. 2 and FIG. 3, the interaction between various components of the data environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 2 is a block diagram of the data communication environment 100 of FIG. 1 illustrating POP routing information being provided in response to a client computing device's POP routing request for data upload. As illustrated in FIG. 2, at (1), a client 102 transmits a request for POP routing information to the POP routing service 110. In some embodiments, the request may correspond to a form of DNS query. In other embodiments, the client 102 may utilize an application program interface ("API") to send this request to the POP routing service 110. The request may include information about the data to be uploaded, such as one or more file identifiers, sizes, types, or priorities associated with the data. The request may also include information about the requesting client 102, such as geographic or network-related location information, computational or networking resources, data fragmentation preferences, data transfer capability or limitations, etc.

At (2), the POP routing service 110 processes the data upload request. The POP routing service 110 may identify information about the upload data and requesting client, and retrieve relevant POP performance data for determining POPs 116 that are potentially suitable to facilitate the data uploading. Optionally at (3), the POP routing service 110 may request and retrieve from the POP service provider 106 additional or specific POP information that may assist the analysis of POP performance. For example, the POP routing service 110 may provide a geographic or network location corresponding to the requesting client 102 and request characteristics and performance data of POPs 116 that may handle high volumes of traffic from the geographic or network location, have short latencies or large bandwidths for communicating with clients close to the location, or are otherwise associated with the location.

At (4), the POP routing service 110 determines a list of POPs 116 that are potentially suitable to facilitate the data uploading. The determination of potentially suitable POPs may include an analysis of throughput rate from the requesting client's geographic region to the data storage service provider, ability to handle the specific type of upload file or fragments, current load and spare capacity, combination of the same, or the like, as examples. In some embodiments, the POP routing service 110 may filter out certain POPs 116 using thresholds on one or more attributes included in the POP performance data. In other embodiments, the POP routing service 110 may compute a suitability score for individual POPs 116 based on a combination of performance attribute values, and select a specified number of POPs with top scores.

At (5), the POP routing service 110 sends POP routing information for data uploading to the requesting client 102. For example, the POP routing service 110 may send a list of candidate POPs 116 with corresponding IP addresses or other network addresses or identifiers to the requesting client 102 in response to its API call for POP routing information. The POP routing information may include a portion of POP performance data relevant to the requested data upload. In some embodiments, the POP routing information may include information for routing to the data storage service provider 104 directly. For example, the POP routing service 110 may have determined that one or more of the data storage service provider's own servers are potentially suitable for receiving data communications from the requesting client 102 directly. Accordingly, POP routing information may list the one or more servers of the data storage service provider 104 with corresponding IP addresses or other network addresses or identifiers.

At (6), the POP routing service 110 provides information regarding the upload data to the data storage service 120. For example, the POP routing service 110 may provide one or more file identifiers, sizes, types, priorities, or data fragmentation preferences associated with the upload data so that the data storage service 120 may perform appropriate actions (e.g., prepare storage space, allocate computation or networking resources, etc.) to facilitate the data upload. In some embodiments, the data storage service 120 may receive such information directly from the client 102 in another request.

FIG. 3 is a block diagram of the data communication environment 100 of FIG. 1 illustrating the generation, transmitting and merging of fragments of upload data. As illustrated in FIG. 3, at (1), upon receipt of the routing information, the client 102 determines which POPs 116 to use for data uploading. The client 102 may further evaluate the POPs included in the routing information and decide which POPs to use for data uploading. For example, the client 102 may analyze performance characteristics associated with the POPs and filter out POPs that do not satisfy certain threshold standards. In some embodiment, the client 102 may actively test the speed, robustness, stability, protocol compatibility or other characteristics of communication with individual POPs. In some embodiments, the client 102 may determine that a portion of the upload data can be directly transmitted to the data storage service provider 104, for example, due to an insufficient number of available or suitable POPs.

With continued reference to FIG. 3, at (2), the client 102 fragments the data to be uploaded. The data fragmentation can be based on the number, capacity, latency, bandwidth, stability, or other performance characteristics of the selected POPs. For example, the upload data can be divided into relatively large fragments if the network connections to a majority of selected POPs are associated with small latencies and high bandwidth. Conversely, if connections to a majority of selected POPs are instable, smaller fragments can be generated to facilitate error correction and data resending. Of course, the data fragment size does not need to be uniform. Larger or smaller fragments can be generated from the same upload data to suit specific network connection conditions between the client 102 and various selected POPs. In some embodiments, the data fragmentation does not disrupt the completeness of individual data files to be uploaded. In other words, each data fragment may include one or more data files in their entirety, and a data file will not be divided in anyway among multiple data fragments.

The data fragmentation can be horizontal, vertical, sequential, or randomized, based on any existing schemes or methods to fragment data files. The data fragmentation can be generated based on plaintext data division or can be encoded, for example, by using any forward error correction (FEC) code such as erasure code. In either case, each fragment can be uniquely identified with a respective identifier, and redundancies can be built into the fragmentation so that a copy of the upload data can be reconstructed from a subset of generated fragments.

At (3), the client 102 establishes network connections with each of the selected POPs using their associated routing information and starts transmitting fragments of the upload data to the POPs. For example, the client 102 may establish independent network paths between the client 102 and each of the selected POPs 116 (i.e., the client 102 being the source and a respective POP 116 being the destination) and may begin transferring the data fragments in accordance with data communication protocols, such as File Transfer Protocol (FTP), Hypertext Transfer Protocol (HTTP) or any other public or proprietary protocols. It should be noted that the client 102 may use the same or different protocols to communicate with different POPs 116.

For each of the communicatively connected POPs, the client 102 may dynamically assign a portion or subset of the upload data fragments to transfer, based on an assessment of the respective performance of the POPs. For example, POPs with sufficient spare capacity and connected to the client 102 with low latency and high bandwidth connections may be assigned a larger number of or larger sized data fragments. The client 102 may keep monitoring the performance of each POP over the course of data fragment transmission and adjust quantities, sizes or types of data fragments that are being assigned to different POPs.

In some embodiments, the client 102 may transfer certain fragments of the upload data directly to one or more servers of the data storage service provider 104, basically treating the data storage service provider as a POP. In some embodiments, a same fragment of upload data may be assigned to transmit to multiple POPs, such as those with questionable stability, to enhance the robustness of the upload process. In some embodiments, the client 102 may decide to cease data transmission to certain POPs or the data storage service provider 104 due to inadequate performance, such as service interruptions, connectivity delays or failures. In some embodiments, the client computing device may redirect transmission of certain data fragments to POPs that were not initially selected to facilitate the data upload.

Once individual POPs 116 receives at least some fragments of upload data from the client 102, at (4), the POPs 116 may forward or relay the data fragments to the data storage service 120. Illustratively, the POPs 116 each may utilize an existing communication channel or establish a new communication channel with the data storage service provider 104 (or its subcomponent such as the data storage service 120) for data fragment transmission between the POP 116 and the data storage service 120. For example, the POP 116 may establish a network path between the POP 116 and the data storage service provider 104 or its subcomponents (i.e., the POP 116 being the source and the data storage service provider 104 or its subcomponent being the destination) over a backbone or overlay network. It should be noted that the POP 116 may communicate with the data storage service provider 104 in accordance with the same or different data communication protocol(s) as utilized for the data communication between the client 102 and the POP 116.

Further, each POP 116 may rearrange, regroup or otherwise manipulate the data fragments that it has received, in order to efficiently forward or relay to the data storage service 120. It should be also noted that some POPs 116 may not be able to successfully relay all the received data fragments due to connection issues between the POP and the data storage service 120. In some embodiments, instead of relaying received data fragments to the data storage service 120 directly, a POP 116 may establish connections with other POPs and forward at least portions of the received data fragments to the other POPs, which in turn may forward to the data storage service 120.

At (5), the data storage service 120 obtains the relayed data fragments and merges them to reconstruct a copy of the upload data. The data storage service 120 may determine that it has received all necessary fragments to reconstruct the upload data, based on a known size of the upload data, an analysis of the unique identifiers associated with the data fragments, an "upload completion" message sent by the client 102, combination of the same, or the like. As described above, in some embodiments, redundancies are built into the data fragmentation and transmission process (e.g., based on a forward error correction code or duplicated transmission of data fragments) so that the data storage service 120 does not need to receive all the data fragments and may proceed with reconstruction of the upload data. In some embodiments, the data storage service 120 may request information, such as the data fragmentation encoding as applied, for merging the data fragments, from the client 102. In other embodiments, the data fragments are self-explanatory or otherwise provide guidance for merging (e.g., sequentially linking the data fragments based on their identifiers).

At (6), the data storage service 120 successfully merges the data fragments to reconstruct a copy of the upload data and stores the copy in an associated data store or database, either locally or network-based. The data storage service 120 then transmits a message to the client 102 confirming successful upload of the data.

Figure 4:
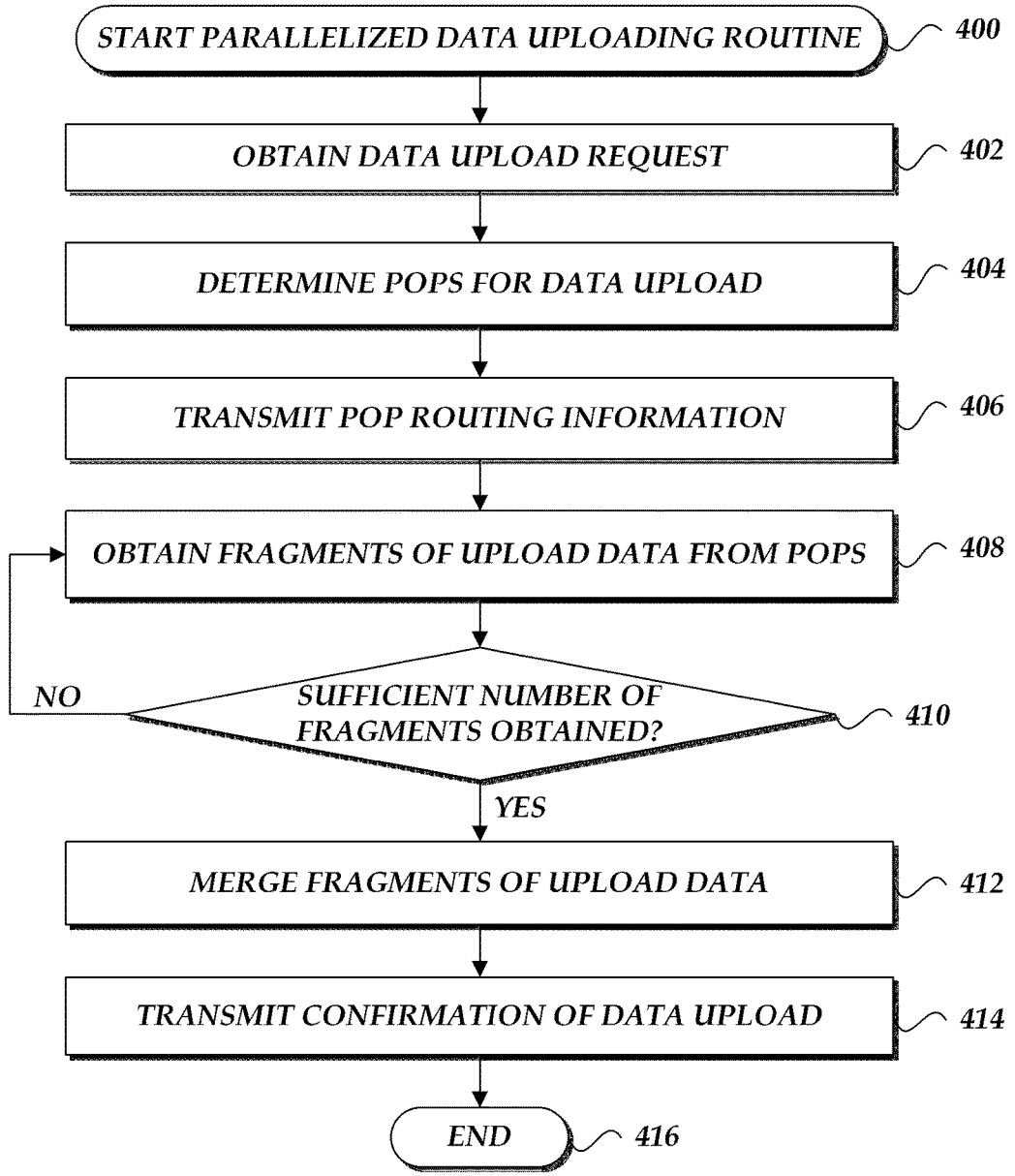
FIG. 4 is a flowchart illustrative of a parallelized data uploading routine implemented by a routing service provider and a data storage service provider.

FIG. 4 is a flowchart illustrative of a parallelized data uploading routine implemented by a routing service provider 103 and a data storage service provider 104. The routine starts at block 400. At block 402, the routing service provider 103 obtains a request for POP routing information for purposes of data upload to the data storage service provider 104. For example, the routing service provider 103 may receive an API call from a client 102 for POP routing information. As described above, the request may include information about the data to be uploaded, such as one or more file identifiers, sizes, types, or priorities associated with the data. The request may also include information about the requesting client 102, such as geographic or network-related location information, computational or networking resources, data fragmentation preferences, data transfer capability or limitations, etc. In some embodiments, the request may be received from one of the POPs 116 or the POP service provider 106, which forwarded the data upload request it had received from the client 102.

At block 404, the routing service provider 103 determines POPs potentially suitable for the data upload request. The routing service provider 103 may identify information about the upload data and requesting client, and retrieve relevant POP performance data for determining POPs 116 that are potentially suitable to facilitate the data uploading. In some embodiments, the routing service provider 103 may request and retrieve from the POP service provider 106 additional or specific POP information that may assist in the data storage service provider's analysis of POP performance. In other embodiments, the routing service provider 104 may provide information about the upload data or the requesting client to the POP service provider 106 and request the POP service provider 106 to determine POPs 116 that may be appropriate for relaying fragments of upload data between the client 102 and the data storage service provider 104. As described above, a list of POPs 116 that that may facilitate the data uploading can be determined based on an analysis of POP characteristics and performance data. For example, throughput rate from the requesting client's geographic region to the data storage service provider, ability to handle the specific type of upload file or fragments, current load and spare capacity, combination of the same, or the like, can be included in the analysis.

At block 406, the routing service provider 104 sends POP routing information for data uploading to the requesting client 102. For example, the routing service provider 104 may send a list of candidate POPs 116 with corresponding IP addresses or other network addresses or identifiers to the requesting client 102 in response to its API call for POP routing information. In some embodiments, the POP routing information may be provided to the client 102 by the POP service provider 106. In some embodiments, the POP routing information may include a portion of POP performance data relevant to the requested data upload. In some embodiments, the POP routing information may include information for routing to the data storage service provider 104 directly.

At block 408, the data storage service provider 104 obtains at least some portion of fragments of the upload data from one or more POPs 116. Illustratively, individual POPs 116 may forward or relay fragments of upload data the POP has received from the client 102 to the data storage service provider 104. As described above, the POPs 116 each may utilize an existing communication channel or establish a new communication channel with the data storage service provider 104, such as a network path between the POP 116 and the data storage service provider 104 (i.e., the POP 116 being the source and the data storage service provider 104 being the destination) over a backbone or overlay network. It should be noted that the POP 116 may communicate with the data storage service provider 104 in accordance with same or different data communication protocol(s) as utilized for the data communication between the client 102 and the POP 116. In something embodiments, the data storage service provider 104 may receive some portion of the upload data fragments from the client 102 directly via a network path connecting the client 102 and the data storage service provider 104.

At block 410, the data storage service provider 104 determines whether it has obtained sufficient data fragments to reconstruct a complete copy of the upload data. Illustratively, the data storage service provider 104 can make this determination based on a known size of the upload data, an analysis of the unique identifiers associated with the data fragments, an "upload completion" message sent by the client 102, combination of the same, or the like. As described above, in some embodiments, redundancies are built into the data fragmentation and transmission process (e.g., based on a forward error correction code, such as erasure code, or duplicated transmission of data fragments) so that the data storage service provider 104 does not need to receive all the data fragments in order to reconstruct a copy of the upload data. If the data storage service provider 104 determines that it has not obtained sufficient number of data fragments yet, the routine proceeds to block 408. Otherwise, the routine proceeds to block 412.

At block 412, the data storage service provider 104 merges or otherwise processes obtained data fragments to reconstruct a complete copy of the upload data. In some embodiments, the data storage service provider 104 may request additional information such as applicable encoding, for merging or otherwise processing the data fragments, from the client 102. In other embodiments, the data fragments are self-explanatory or otherwise provide guidance for merging (e.g., sequentially linking the data fragments based on their identifiers). At block 414, the data storage service provider 104 completes reconstruction of a copy of the upload data and transmits a confirmation message to the client 102. In some embodiments, the confirmation may be relayed or forwarded to the client 102 by a POP 116. The routine of FIG. 4 ends at block 416.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for data communication, the computer-implemented method comprising:
    under control of one or more computing devices configured with specific computer executable instructions:
        obtaining a request to upload target data from a client computing device to the one or more computing devices;
        determining a set of points of presence (POPs) to facilitate uploading of the target data from the client computing device to the one or more computing devices based on performance information associated with the set of POPs, wherein the performance information is maintained by the one or more computing devices based on communications between the set of POPs and the one or more computing devices;
        providing routing information regarding the set of POPs to the client computing device, wherein the client computing device transmits fragments of the target data to at least a subset of the set of POPs based, at least in part, on the routing information, and wherein, during fragment transmission, the client computing device adjusts a number of the fragments transmitted to individual POPs in the subset based at least in part on a performance of the individual POPs in the subset;
        obtaining the fragments of the target data from the subset of POPs;
        merging the fragments of the target data into a copy of the target data; and
        causing storage of the copy of the target data.

2. The computer-implemented method of claim 1, wherein the client computing device generates the target data fragments in accordance with a data fragmentation encoding.

3. The computer-implemented method of claim 2, wherein the data fragmentation encoding comprises forward error correction code.

4. The computer-implemented method of claim 1, wherein the client computing device transmits at least a subset of the target data fragments to a POP of the subset of POPs via a first network path, wherein the POP corresponds to a destination of the first network path.

5. The computer-implemented method of claim 4, wherein the POP transmits the at least a subset of the target data fragments via a second network path, wherein the POP corresponds to a source of the second network path.

6. The computer-implemented method of claim 1, wherein the client computing device communicates with a first POP of the subset of POPs in accordance with a first network protocol and communicates with a second POP of the subset of POPs in accordance with a second network protocol.

7. The computer-implemented method of claim 1, wherein the request to upload target data includes at least one of a size, type, or priority associated with the target data.

8. The computer-implemented method of claim 1, wherein determining the set of POPs comprises analyzing the performance information associated with at least one of the POPs in the set of POPs and wherein the analysis of the performance information is based, at least in part, on an attribute associated with the target data or associated with the client computing device.

9. The computer-implemented method of claim 8, wherein the performance information corresponds to at least one of latency, geographic proximity, bandwidth, throughput, capacity, cost, load or availability.

10. A non-transitory computer readable storage medium storing computer executable instructions that when executed by one or more processors of one or more computing devices perform operations comprising:
    obtaining a request to upload target data to the one or more computing devices;
    causing transmission of routing information regarding a set of points of presence (POPs) to a client computing device, wherein the set of POPs are determined based on performance information associated with the set of POPs, wherein the performance information is maintained by the one or more computing devices based on communications between the set of POPs and the one or more computing devices, wherein the client computing device transmits fragments of the target data to at least a first subset of POPs of the set of POPs based, at least in part, on the routing information, and wherein, during fragment transmission, the client computing device adjusts a number of the fragments transmitted to individual POPs in the first subset based at least in part on a performance of the individual POPs in the first subset;

obtaining the fragments of the target data from the set of POPs; and causing reconstruction of the target data based, at least in part, on the fragments of the target data.

11. The non-transitory computer readable storage medium of claim 10, wherein the client computing device transmits a portion of the target data fragments to a target POP of the first subset of POPs in accordance with a first network protocol and wherein the target POP transmits the portion of the target data fragments to a data storage system in accordance with a second network protocol.

12. The non-transitory computer readable storage medium of claim 10, wherein transmission of the routing information includes transmission of the performance information corresponding to individual POPs of the set of POPs.

13. The non-transitory computer readable storage medium of claim 12, wherein the client computing device generates the target data fragments based, at least in part, on a number of POPs included in the first subset.

14. The non-transitory computer readable storage medium of claim 12, wherein the client computing device selects the first subset of POPs based, at least in part, on the performance information.

15. The non-transitory computer readable storage medium of claim 10, wherein the client computing device initiates transmission of the target data fragments to individual POPs of the first subset of POPs.

16. The non-transitory computer readable storage medium of claim 10, wherein the client computing device transmits at least a subset of the target data fragments to a second subset of POPs of the set of POPs.

17. The non-transitory computer readable storage medium of claim 16, wherein obtaining the target data fragments from the set of POPs comprises obtaining the target data fragments exclusively from the second subset of POPs.

18. A system comprising:
a data store configured to at least store computer-executable instructions; and
a processor in communication with the data store, the processor configured to execute the computer-executable instructions to at least:
send a request to upload target data to a data storage service provider;
in response to the request, receive routing information regarding a set of points of presence (POPs) determined by the data storage service provider, wherein the set of POPs are determined based on performance information associated with the set of POPs, wherein the performance information is maintained by the data storage service provider based on communications between the set of POPs and the data storage service provider;
cause fragmentation of the target data;
transmit fragments of the target data resulting from the fragmentation to at least a subset of the set of POPs based, at least in part, on the routing information; and
as the fragments are transmitted, adjust a number of the fragments transmitted to individual POPs in the subset based at least in part on a performance of the individual POPs in the subset.

19. The system of claim 18, wherein the processor is further configured to execute the computer-executable instructions to send processing information for reconstructing the target data based on at least a portion of the transmitted target data fragments.

20. The system of claim 18, wherein at least one POP of the subset of POPs transmits at least a portion of the target data fragments to a POP of a second set of POPs.

* * * * *